R. J. WILLIAMS.
Feed-Regulators.
No. 148,395. Patented March 10, 1874.
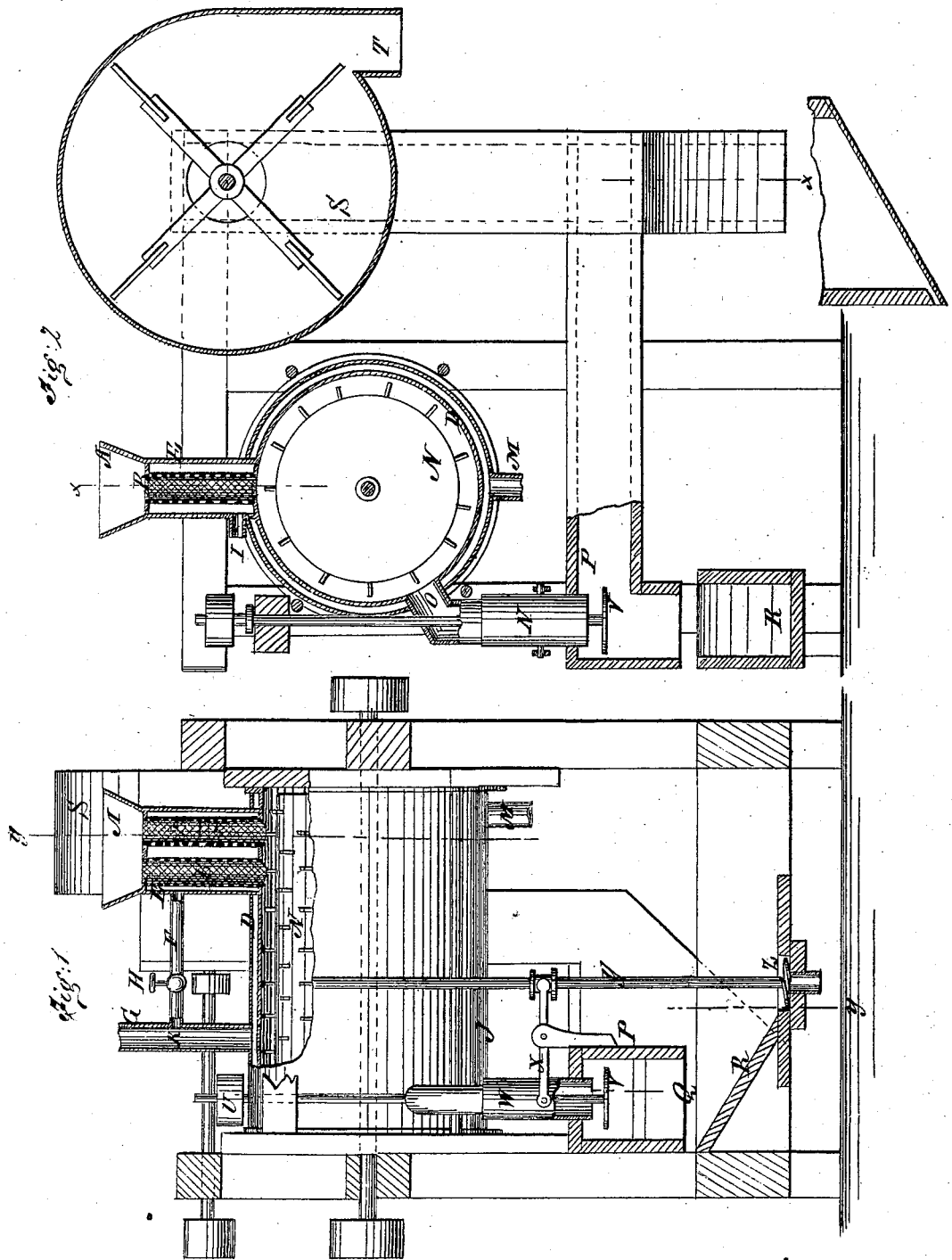

UNITED STATES PATENT OFFICE.

RICHARD J. WILLIAMS, OF OTTUMWA, IOWA.

IMPROVEMENT IN FEED-REGULATORS.

Specification forming part of Letters Patent No. 148,395, dated March 10, 1874; application filed June 21, 1873.

*To all whom it may concern:*

Be it known that I, RICHARD J. WILLIAMS, of Ottumwa, in the county of Wapello and State of Iowa, have invented a new and Improved Feeding Device for Grain-Mills, of which the following is a specification:

The invention will first be fully described, and then pointed out in the claim.

Figure 1 is a longitudinal sectional elevation on line x x of Fig. 2. Fig. 2 is a transverse sectional elevation on line y y of Fig. 1.

Similar letters of reference indicate corresponding parts.

A represents a small hopper, into which the grain is delivered from the garner. B represents two large vertical perforated tubes, for conducting the grain from hopper A into the scouring-cylinder D. They are surrounded by the steam-jacket E, to which the steam is admitted from the main pipe G by the pipe F, having a stop-cock, H, to shut off the steam when required. I is the waste-pipe for the condensed steam in jackets E. J is the steam-jacket surrounding the scouring-cylinder D. The steam is admitted to it by the pipe G. Said pipe has a cock, K, below the connection of pipe F with it, to shut off the steam from the drying-jacket J, while admitting it to the steaming-jacket E. The condensed steam is drawn out of drying-jacket J at the waste-pipe M. N is the revolving scouring-cylinder, within the stationary hollow cylinder D. These are arranged similar to other scouring-machines, with short teeth or projections to act on the grain, with which the machine is kept full. O is the discharge-spout, which branches out from the side of the scouring-cylinder, and assumes a vertical direction, and terminates inside of the wind-spout P, which opens downward at Q over the hopper R, and receives the air thereat, which is sucked up by the fan S, to separate the light matters and discharge them at T. From the mouth of the spout O the grain falls in a broken stream, through which the air can circulate freely to separate the said light matters. A little below the lower end of the spout O is a revolving disk, V, on the lower end of a shaft, which projects up through the spout, and has a pulley, U, for turning it, and above this disk is a vertically-sliding tube, W, which is connected to one end of a rock-lever, X, mounted on a pivot at its middle, and connected at the other end to the vertically moving and revolving shaft Y, so that, as the shaft rises and falls, it will shift the tube down and up, and vary the discharge of the grain from the tube. This shaft extends down into the passage from the hopper R to the spout leading to the hopper of the mill-stones, and has a spiral disk, Z, thereat, which will rise when the stone-hopper is full and the grain backs up into hopper R, and by forcing the sleeve W down, shut off the escape from the scouring and drying cylinder, and retain the grain therein until wanted.

By the steaming and drying apparatus attached to the scouring apparatus, I can steam and moisten the grain to any required extent as it goes to the scourer, using the regulating-cocks to govern the application of the steam, as may be wished.

By so treating it, and thoroughly cleaning the bran which is not removed by the scouring process, I am enabled to grind the skin cleaner; also, to clean the bran more thoroughly, and thus make a larger yield of flour, and at the same time make a higher grade.

Having thus described my invention, I claim as new and desire to secure by Letters Patent—

The combination of the rotary and vertically reciprocating shaft Y, spiral disk Z, and lever X, with the tube W and disk V, the said shaft and disk being arranged in combination with the discharge-passage of the hopper R, substantially as specified.

RICHARD J. WILLIAMS.

Witnesses:
ADDISON W. DIGGS,
Z. C. JOHNSON.